H. E. WALKER.
Grain-Separators.
No. 210,063.  Patented Nov. 19, 1878.
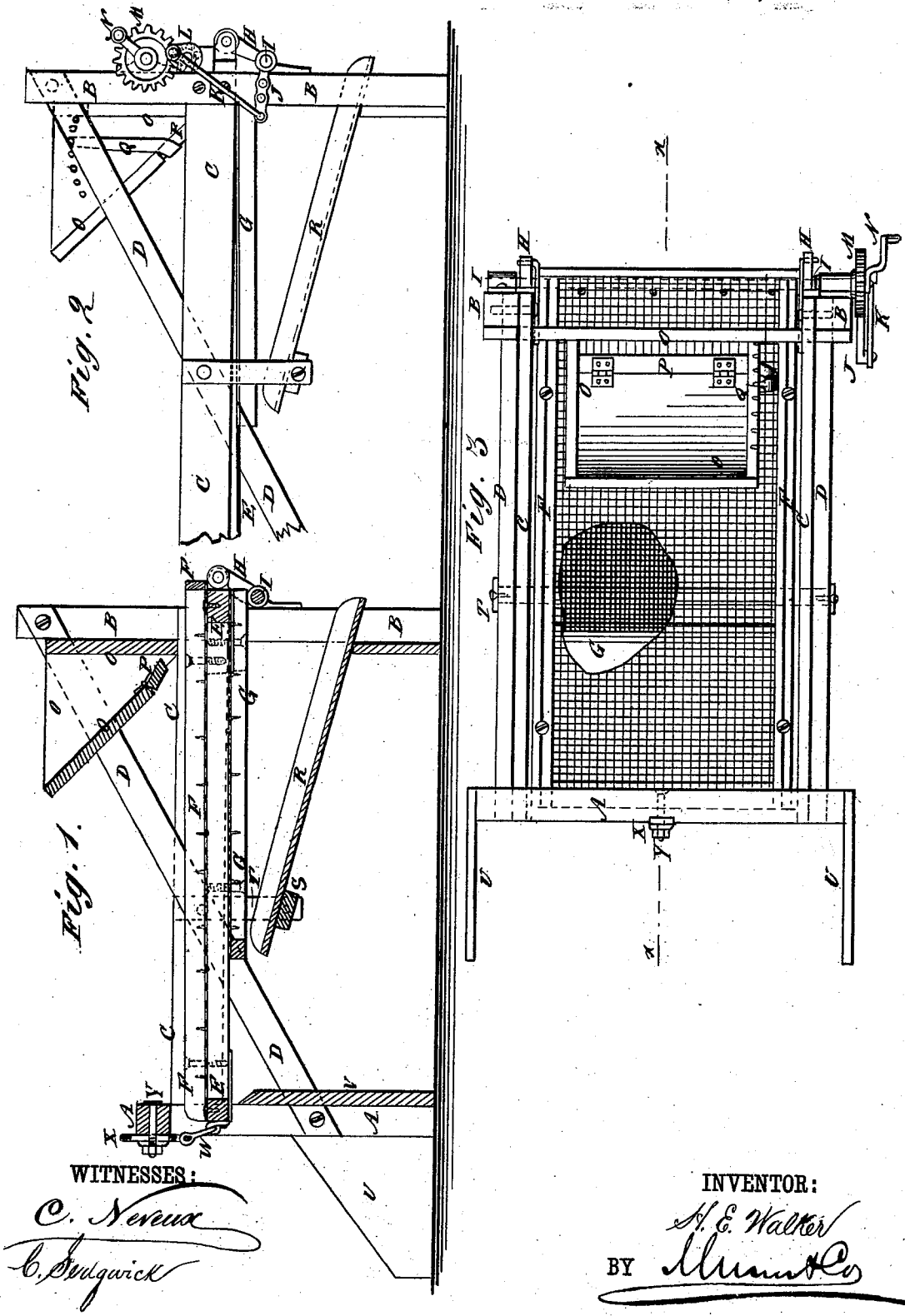
WITNESSES:
C. Neveux
C. Sedgwick
INVENTOR:
H. E. Walker
BY Munn & Co
ATTORNEYS.

UNITED STATES PATENT OFFICE.

HENRY E. WALKER, OF FOUNTAIN, MINNESOTA.

IMPROVEMENT IN GRAIN-SEPARATORS.

Specification forming part of Letters Patent No. 210,063, dated November 19, 1878; application filed May 14, 1878.

*To all whom it may concern:*

Be it known that I, HENRY ELLIS WALKER, of Fountain, in the county of Fillmore and State of Minnesota, have invented a new and useful Improvement in Seed-Wheat Cleaners, of which the following is a specification:

Figure 1 is a vertical longitudinal section of my improved machine, taken through the line $x\ x$, Fig. 3. Fig. 2 is a side view of the rear part of the same. Fig. 3 is a top view of the same, a part of the screen being broken away to show the lower screen.

Similar letters of reference indicate corresponding parts.

The object of this invention is to furnish an improved machine for removing cockle-seed, wild buckwheat, and other impurities from seed-wheat after it has been passed through an ordinary fan-mill and cleaned as much as it can be cleaned by such mills, and which shall be simple in construction, inexpensive in manufacture, convenient in use, and effective in operation, removing all trash from the seed.

The invention consists in the construction and combination of parts, which will be hereinafter fully described, and then set forth in the claims.

A is the front-end frame, and B is the rear-end frame, of the machine, which are vertical, and are connected by side bars C, secured to them detachably. The frame-work is strengthened by the inclined braces D, attached to the frames A B and the side bars C, as shown in Figs. 1 and 2.

E is a frame, the corners of which are strengthened by angle-irons, and to the upper side of which is attached a screen, F, which is made without any cross-bar at its forward end, and the meshes of which are of such a size that the cockle-seed, wild buckwheat, and the smaller kernels of wheat will pass through it while the full plump kernels suitable for seed will pass forward and fall from its forward end. To the under side of the frame E is attached the lower screen, G, the meshes of which are smaller than the meshes of the screen F, so as to allow cockle-seed, wild buckwheat, and other small seeds to pass through it, while the smaller kernels of wheat pass forward and fall from its forward end. To the rear corners of the frame E are pivoted crank-arms H, which are formed upon or attached to the rod I, which works in bearings attached to the posts of the rear-end frame B a little below the screens.

To one end of the rod I is attached a crank-arm, J, to which is pivoted the lower end of a connecting-rod, K, the upper end of which is pivoted to a crank-pin attached to a small gear-wheel, L. The teeth of the gear-wheel L mesh into the teeth of the larger gear-wheel M, to which is attached a crank, N, by means of which power is applied to the machine.

The gear-wheels L M are both pivoted to the same bearing-block, which is attached to the post of the end frame B, so that the said gear-wheels will always remain properly in gear, however much the timber of the framework may swell and shrink.

Several holes are formed in the crank-arm J to receive the lower end of the connecting-rod K, to enable the movement of the screens to be increased or diminished, as may be desired. The crank-arm J is made so much longer than the crank of the small gear-wheel L that the revolution of the said gear-wheel will only rock the shaft J. By this construction, as the crank N is turned an up-and-down movement will be given to the rear end of the screens, which will cause the seed placed upon them to be carried forward slowly toward the forward end of the said screens, the cockle and wild buckwheat and the small kernels of wheat passing through, as before described, and the full plump kernels of wheat suitable for seed being discharged from the forward end of the said screen F.

The seed is fed to the screen F from the hopper O, which is made with its ends and one side vertical and its other side inclined, the ends of its vertical side projecting and being secured to the posts of the rear-end frame B. Between the lower edge of the inclined side and the lower part of the vertical side of the hopper O is left an opening, which is closed by a gate, P, hinged at one edge to the lower edge of the inclined side of the hopper, so that its free edge may be adjusted close against the vertical side of the hopper, or at any de sired distance from said vertical side, to feed the grain slower or faster to the screen, as may be desired.

To the hinged gate P is attached a lever, Q, which passes up along one end of the hopper O and engages with recesses formed in or ratchet-teeth attached to the said end, so as to hold the lever Q and gate P in any desired position, and enable the said gate to be easily and quickly adjusted.

R is an inclined apron, the rear end of which rests upon the cross bar or board attached to the lower part of the posts of the rear-end frame B, and its upper end rests upon a cross-bar, S, which is supported from the side bars C by metal straps T. By this construction cockle, wild buckwheat, &c., that pass through the lower screen, G, is received upon the apron R, and is guided to to the rear end of the machine, where it falls upon the floor. The seed that passes off the forward end of the lower screen, G, falls upon the floor beneath the machine, and the clean seed-wheat falls upon the floor at the forward end of the machine.

To the posts of the forward-end frame A are attached boards U V to prevent the seed-wheat that falls from the forward end of the screen F and the marketable wheat that falls from the forward end of the screen G from becoming mixed upon the floor.

To the forward end of the frame E is attached a link or short chain, W, the upper end of which is attached to a plate, X. The plate X is slotted longitudinally to receive a bolt, Y, which passes through it and through the top cross-bar of the frame A. By this arrangement, by loosening the nut of the bolt Y the forward end of the screens may be adjusted higher or lower, as may be desired, to cause the wheat to pass along the said screens slower or faster, as may be required.

Having thus described my invention, what I claim as new, and desire to secure by Letters Patent, is—

1. The combination, with the shoe C, supported at the feed end upon the arms of the rock-shaft I, having adjustable arm J, and at the discharge end by the adjustable plate X and link W, of a hopper having a variable seed-opening, substantially as described.

2. The combination of the variable feed O, the shoe having screens of different fineness, and supported by adjustable rock-shaft at one end and by the adjustable link at the other, of the dividing-chute pivoted to and moving with said shoe, substantially as described.

HENRY E. WALKER.

Witnesses:
 JOHN HACKETT,
 WILLIAM BONNEY.